US011700049B2

(12) United States Patent
Zhu et al.

(10) Patent No.: US 11,700,049 B2
(45) Date of Patent: Jul. 11, 2023

(54) TECHNIQUES FOR BEAM SWITCHING IN WIRELESS COMMUNICATIONS

(71) Applicant: QUALCOMM Incorporated, San Diego, CA (US)

(72) Inventors: Jun Zhu, San Diego, CA (US); Yongle Wu, San Diego, CA (US); Raghu Narayan Challa, San Diego, CA (US); Brian Clarke Banister, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/477,324

(22) Filed: Sep. 16, 2021

(65) Prior Publication Data

US 2022/0094421 A1    Mar. 24, 2022

Related U.S. Application Data

(60) Provisional application No. 63/081,173, filed on Sep. 21, 2020.

(51) Int. Cl.
*H04B 7/06* (2006.01)
*H04B 7/08* (2006.01)
*H04B 17/309* (2015.01)

(52) U.S. Cl.
CPC .......... *H04B 7/088* (2013.01); *H04B 7/0854* (2013.01); *H04B 17/309* (2015.01)

(58) Field of Classification Search
CPC .... H04B 7/088; H04B 7/0854; H04B 17/309; H04B 7/0695
See application file for complete search history.

(56) References Cited

U.S. PATENT DOCUMENTS

| 2016/0007261 | A1* | 1/2016 | Oh | H04B 7/0695 |
|---|---|---|---|---|
| | | | | 455/438 |
| 2018/0191416 | A1* | 7/2018 | Palenius | G01S 11/10 |
| 2018/0324853 | A1* | 11/2018 | Jeon | H04W 52/04 |
| 2019/0116613 | A1* | 4/2019 | Abedini | H04W 74/0833 |
| 2019/0150133 | A1* | 5/2019 | Li | H04B 7/0695 |
| | | | | 375/224 |

(Continued)

FOREIGN PATENT DOCUMENTS

WO    WO-2017099830 A1    6/2017

OTHER PUBLICATIONS

International Search Report and Written Opinion—PCT/US2021/050851—ISA/EPO—dated Dec. 21, 2021.

(Continued)

*Primary Examiner* — Kenneth T Lam
(74) *Attorney, Agent, or Firm* — Dalei Dong; Holland & Hart LLP

(57) ABSTRACT

Methods, systems, and devices for wireless communications are described in which a user equipment (UE) may identify one or more candidate beams that have a better channel metric than a serving beam. The UE may initiate a beam switch measurement counter, and perform one or more measurements on the identified candidate beams. In the event that one of the candidate beams is better than the serving beam for each measurement of the one or more measurements, the UE may perform a beam switch procedure to switch from the serving beam to the candidate beam.

30 Claims, 13 Drawing Sheets

(56) References Cited

U.S. PATENT DOCUMENTS

| | | | | |
|---|---|---|---|---|
| 2019/0274169 A1* | 9/2019 | Tsai | | H04W 56/003 |
| 2020/0374960 A1* | 11/2020 | Deenoo | | H04W 72/1284 |
| 2021/0226684 A1* | 7/2021 | Koskela | | H04W 72/042 |
| 2021/0306041 A1* | 9/2021 | Gao | | H04L 5/0092 |
| 2022/0053546 A1* | 2/2022 | Shi | | H04W 72/1273 |
| 2022/0329295 A1* | 10/2022 | Park | | H04B 17/318 |

OTHER PUBLICATIONS

Samsung: "Mobility States and Speed Dependant Scaling of Measurement Related Parameters in NR IDLE/ Inactive Mode", 3GPP Draft, 3GPP TSG-RAN WG2 2017 RAN2#98 Meeting, R2-1705828 Mobility States and Speed Dependant Scaling of Measurement Related Parameters in NR IDLE Inactive Mode_R3, 3rd Generation Partnership Project (3GPP), Mobile Competence Centre, vol. RAN WG2, No. Hangzhou, China, May 15, 2017-May 19, 2017 May 12, 2017 (May 12, 2017), XP051283938, 3 Pages, Retrieved from the Internet: URL: http://www.3gpp.org/ftp/tsg_ran/WG2_RL2/TSGR2_98/Docs/ [retrieved on May 12, 2017] 3rd Paragraph, p. 2.

\* cited by examiner

TECHNIQUES FOR BEAM SWITCHING IN WIRELESS COMMUNICATIONS

CROSS REFERENCE

The present Application for Patent claims the benefit of U.S. Provisional Patent Application No. 63/081,173 by ZHU et al., entitled "TECHNIQUES FOR BEAM SWITCHING IN WIRELESS COMMUNICATIONS," filed Sep. 21, 2020, assigned to the assignee hereof, and expressly incorporated by reference herein.

FIELD OF TECHNOLOGY

The following relates to wireless communications, including techniques for beam switching in wireless communications.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Devices of a wireless communications system, such as UEs and base stations, may support beamforming to enhance communication reliability and efficiency using directional signal transmission. These devices may switch between various directional beams based on channel conditions, relative directions between UE and base station antenna panels, UE mobility, and the like. Efficient switching between beams may be desirable to enhance the efficiency and reliability of beamformed wireless communications.

SUMMARY

The described techniques relate to improved methods, systems, devices, and apparatuses that support techniques for beam switching in wireless communications. In various aspects, a user equipment (UE) may establish beamformed communications with a base station using a serving beam. The UE may identify one or more different beams, which may be referred to as candidate beams, that have a better channel metric than the serving beam. For example, the UE may identify that one or more candidate beams have a higher reference signal received power (RSRP), reference signal received quality (RSRQ), signal to noise ratio (SNR), or any combinations thereof. Based on such an identification, the UE may initiate a beam switch measurement counter, and perform one or more measurements on the identified candidate beam(s). In the event that one of the candidate beams is better than the serving beam for each measurement of the one or more measurements, the UE may perform a beam switch procedure to switch from the serving beam to the candidate beam. In the event that the one or more measurements of the identified candidate beam(s) are not better than the serving beam, the UE may continue communications using the serving beam. Such techniques may enhance network efficiency and reliability by allowing a UE to confirm that an identified candidate beam has channel metrics that support a beam switch procedure prior to initiating the beam switch procedure.

A method of wireless communication at a UE is described. The method may include identifying a beam metric of a serving beam, determining that one or more beam metrics of one or more candidate beams exceeds the beam metric of the serving beam at the UE, initiating a beam switch measurement counter based on the determination, where the beam switch measurement counter is associated measurement count threshold, measuring one or more beam metrics, based on the measurement count threshold, for each of the one or more candidate beams, and selecting the serving beam or a first candidate beam of the one or more candidate beams to use for communications based on the measuring.

An apparatus for wireless communication at a UE is described. The apparatus may include a processor, memory coupled with the processor, and instructions stored in the memory. The instructions may be executable by the processor to cause the apparatus to identify a beam metric of a serving beam, determine that one or more beam metrics of one or more candidate beams exceeds the beam metric of the serving beam at the UE, initiate a beam switch measurement counter based on the determination, where the beam switch measurement counter is associated measurement count threshold, measure one or more beam metrics, based on the measurement count threshold, for each of the one or more candidate beams, and select the serving beam or a first candidate beam of the one or more candidate beams to use for communications based on the measuring.

Another apparatus for wireless communication at a UE is described. The apparatus may include means for identifying a beam metric of a serving beam, determining that one or more beam metrics of one or more candidate beams exceeds the beam metric of the serving beam at the UE, initiating a beam switch measurement counter based on the determination, where the beam switch measurement counter is associated measurement count threshold, measuring one or more beam metrics, based on the measurement count threshold, for each of the one or more candidate beams, and selecting the serving beam or a first candidate beam of the one or more candidate beams to use for communications based on the measuring.

A non-transitory computer-readable medium storing code for wireless communication at a UE is described. The code may include instructions executable by a processor to identify a beam metric of a serving beam, determine that one or more beam metrics of one or more candidate beams exceeds the beam metric of the serving beam at the UE, initiate a beam switch measurement counter based on the determination, where the beam switch measurement counter is associated measurement count threshold, measure one or more beam metrics, based on the measurement count threshold, for each of the one or more candidate beams, and select the serving beam or a first candidate beam of the one or more candidate beams to use for communications based on the measuring.

In some examples of the method, apparatuses, and non-transitory computer-readable medium described herein, the selecting may include operations, features, means, or instructions for determining that the first candidate beam of the one or more candidate beams has a first candidate channel metric that exceeds the beam metric of the serving beam in each of one or more measurements of the first candidate beam, and where the method further includes switching from the serving beam to the first candidate beam responsive to the determining.

Some examples of the method, apparatuses, and non-transitory computer-readable medium described herein may further include operations, features, means, or instructions for identifying a type of mobility of the UE, and setting the measurement count threshold based on the type of mobility. In some examples of the method, apparatuses, and non-transitory computer-readable medium described herein, the type of mobility may be identified based on one or more of a motion sensor input, a positioning system input, a channel metric rate of change of one or more channel metric measurements, or any combinations thereof.

Some examples of the method, apparatuses, and non-transitory computer-readable medium described herein may further include operations, features, means, or instructions for transmitting a beam switch indication to a serving base station based on determining to use the first candidate beam for communications.

In some examples of the method, apparatuses, and non-transitory computer-readable medium described herein, the selecting may include operations, features, means, or instructions for determining to maintain the serving beam based on the beam metric of the serving beam being better than at least one candidate channel metric from each of the one or more candidate beams. In some examples of the method, apparatuses, and non-transitory computer-readable medium described herein, the UE falls back to an original scheduling grant of the serving beam based on the determination to maintain the serving beam.

In some examples of the method, apparatuses, and non-transitory computer-readable medium described herein, the one or more beam metrics from each of the one or more candidate beams may be measured only for the one or more candidate beams for a duration of the measuring the one or more beam metrics. In some examples of the method, apparatuses, and non-transitory computer-readable medium described herein, the one or more beam metrics include one or more of a reference signal received power (RSRP), a reference signal received quality (RSRQ), a signal to noise ratio (SNR), or any combinations thereof.

In some examples of the method, apparatuses, and non-transitory computer-readable medium described herein, the initiating the beam switch measurement counter may be performed at a beam scheduling manager of the UE. In some examples of the method, apparatuses, and non-transitory computer-readable medium described herein, the determining may be performed by a beam switch decision manager of the UE. In some examples of the method, apparatuses, and non-transitory computer-readable medium described herein, the beam switch decision manager enables a separate beam switch measurement counter for each identified candidate beam. In some examples of the method, apparatuses, and non-transitory computer-readable medium described herein, the beam switch decision manager disables the beam switch measurement counter for an associated candidate beam based on the beam metric of the serving beam exceeding a candidate channel metric of the associated candidate beam.

DETAILED DESCRIPTION

Figure 1:
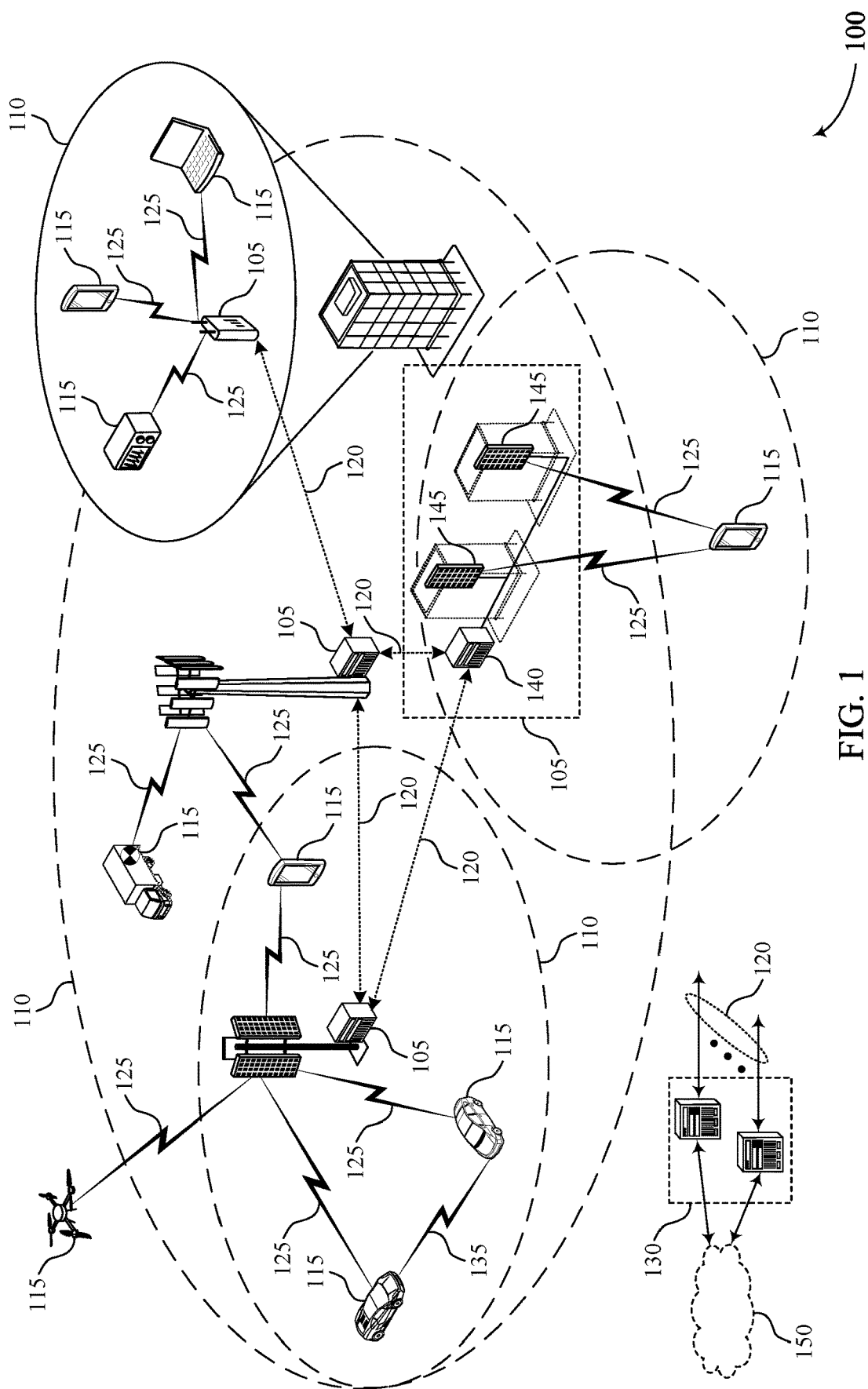
FIG. 1 illustrates an example of a system for wireless communications that supports techniques for beam switching in wireless communications in accordance with aspects of the present disclosure.

Devices of a wireless communications system may support beamforming to enhance reliability and efficiency using directional signal transmission. For example, a base station and a user equipment (UE) may communicate using various beam pairs, and the devices may transition between beams during communications. In some cases, the UE may perform periodic measurements for a serving beam and one or more other beams, with channel metric measurements of the one or more other beams stored in a measurement database (MDB). In the event that the UE determines that one or more channel metrics in the MDB are better than a measured metric of the serving beam, the UE may initiate a beam switch procedure to switch to the beam with the better channel metric. However, in cases where the UE may be experiencing relatively high mobility or changing channel conditions, the measurements in the MDB may become stale relatively quickly. Techniques as discussed herein provide that one or more candidate beams that may be identified may then be measured prior to initiating the beam switch procedure.

For example, a 5G system may use millimeter wave (mmW) wavelengths for communications, with relatively narrow beam widths that may provide for high-speed uplink and downlink communications. Due to the relatively narrow beam widths, the UE and base station may need to perform beam tracking and beam switching to maintain high-speed and smooth communications. Further, in cases with relatively high mobility and/or fading, such beam tracking and switching may occur relatively frequently. In order to enable beam switching, the UE may measure various different beams at different occasions, and store one or more associated beam metrics (e.g., reference signal received power (RSRP), reference signal received quality (RSRQ), signal-to-noise ratio (SNR), or any combinations thereof) into the MDB. In some cases, the base station may perform a beam sweep operation in which different beams (e.g., associated with different synchronization signal blocks (SSBs)), are used to transmit reference signals (e.g., channel state information reference signals (CSI-RSs)) in a time division multiplexing (TDM) manner. Based on measurements of the different beams, the UE may identify that a particular beam (or multiple beams) may be better than a current serving beam. In traditional systems, the UE may simply switch to the identified better beam. However, in the event that a measurement in the MDB is stale (e.g., the associated beam metric has changed significantly since the time of the measurement in the MDB), simply switching based on the stored measurement in the MDB may not result in a better beam being selected, and may result in throughout degradation, or ping-pong switching between different beams.

In accordance with techniques such as discussed herein, in the event that the UE identifies that a candidate beam has a better channel metric than a current serving beam (e.g., in terms of certain beam metric such as RSRP, RSRQ, SNR, etc., or their combinations), a beam switch measurement counter may be enabled. The beam switch measurement counter may be, for example, a timer that corresponds to a certain number of periods of a beam measurement, a number of beam measurements to be performed, and the like. When the beam switch measurement counter is enabled, the UE may measure the identified candidate beam (or beams) and the current serving beam, and not perform measurements for beams other than the identified candidate beam(s) and serving beam. The UE may measure the beams in a round-robin or alternating manner until either the identified candidate beam(s) have a measurement that does not exceed that of the serving beam, or the beam switch measurement counter reaches a measurement count threshold. If a candidate beam has a better (e.g., higher) channel metric that the serving beam for each measurement instance of the beam switch measurement counter, the UE may switch to that candidate beam. If the candidate beam (or one of multiple candidate beams) is not better than the serving beam during the beam switch measurement counter measurements, the UE may fall back to its original scheduling order using the serving beam. In some cases, the beam switch measurement counter threshold may be selected based on a type of mobility of the UE (e.g., certain types of mobility may have a low threshold value and other types of mobility may have a higher threshold value).

Such techniques may enable a device (e.g., a UE, or other communications device) to implement beam switching based on the beam measurements initiated while the beam switch measurement counter is enabled, which may result in improved performance in the wireless communications system. For example, a device may experience relatively high mobility, which may result in one or more measurements in the MDB being stale for an identified candidate beam. By performing measurements on the candidate beam, the UE may confirm that the identified candidate beam is better than the serving beam prior to switching. If the identified candidate beam is not better than the current serving beam, the UE may maintain the current serving beam until a better candidate beam is identified and confirmed. Such technique may thus enhance the efficiency and reliability of beam-formed communications.

Aspects of the disclosure are initially described in the context of wireless communications systems. Aspects of the disclosure are further illustrated by and described with reference to apparatus diagrams, system diagrams, process flows, and flowcharts that relate to techniques for beam switching in wireless communications.

FIG. 1 illustrates an example of a wireless communications system 100 that supports techniques for beam switching in wireless communications in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels.

In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

In some cases, when using beamformed communications, a UE 115 and base station 105 may communicate using various beam pairs, and the devices may transition between beams during communications. In some cases, the UE 115 may perform periodic measurements for a serving beam and one or more other beams, with channel metric measurements of the one or more other beams stored in a MDB. In the event that the UE 115 determines that one or more channel metrics in the MDB are better than a measured metric of the serving beam, the UE 115 may initiate a beam switch procedure to switch to the beam with the better channel metric, in which a beam switch measurement counter is enabled. The UE 115 may measure one or more identified candidate beams and the serving beam while the beam switch measurement counter is enabled, and perform a beam switch to a candidate beam in the event that the candidate beam has a channel metric that is better than an associated channel metric of the serving beam.

Figure 2:
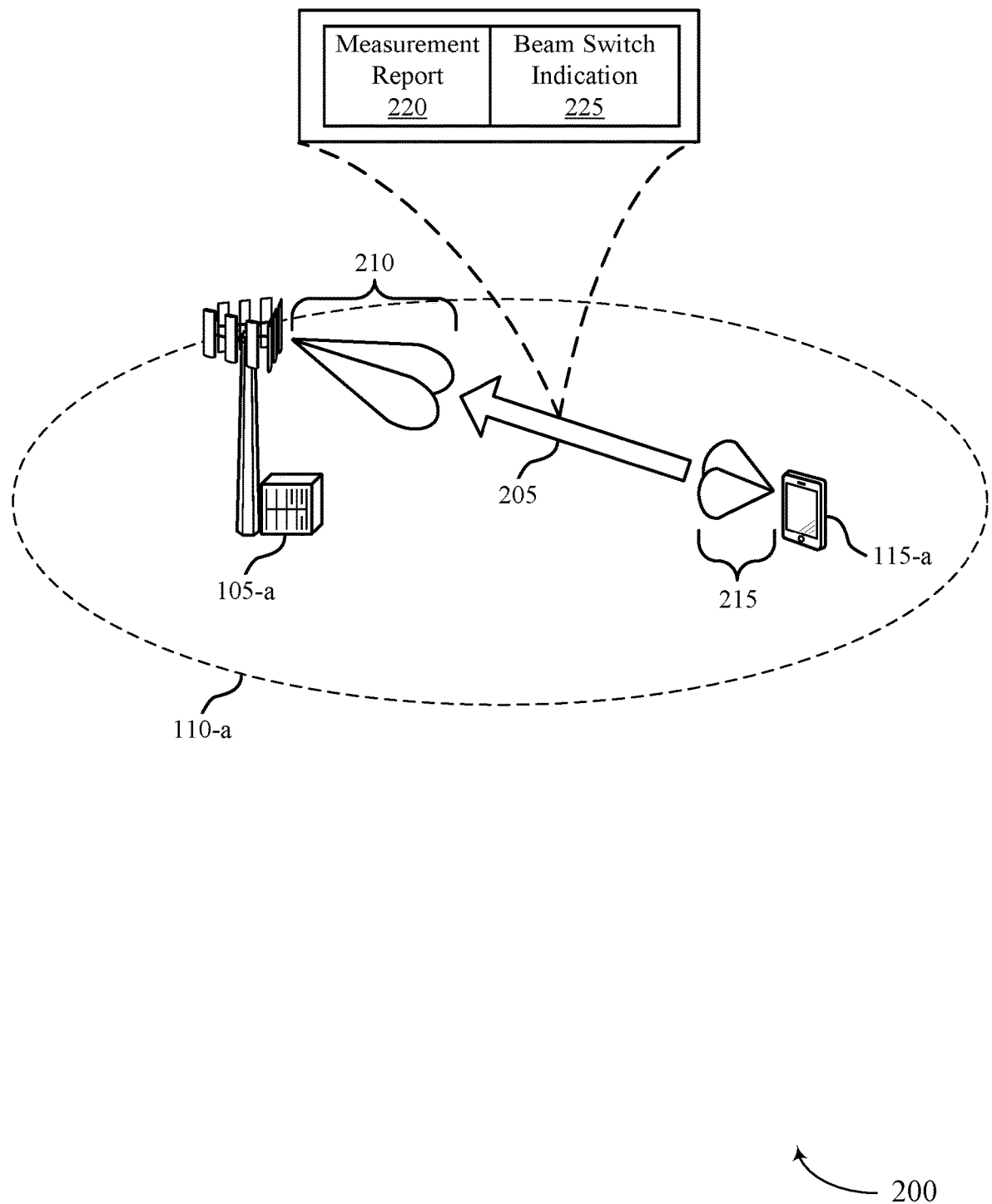
FIG. 2 illustrates an example of a portion of a wireless communications system that supports techniques for beam switching in wireless communications in accordance with aspects of the present disclosure.

FIG. 2 illustrates an example of a wireless communications system 200 that supports techniques for beam switching in wireless communications in accordance with aspects of the present disclosure. In some examples, wireless communications system 200 may implement aspects of wireless communications system 100. For example, the wireless communications system 200 may include a UE 115-a and a base station 105-a, which may be examples of the corresponding devices described with reference to FIG. 1. Generally, the wireless communications system 200 may illustrate an example of communications 205 between the UE 115-a and the base station 105-a within coverage area 110-a.

The devices of the wireless communications system 200 may support beamforming to enhance reliability and efficiency using directional signal transmission. In some examples, the base station 105-a may indicate one or more downlink beams 210 (e.g., via transmission configuration indicator (TCI) states configured with quasi-co-location (QCL) Type D properties in NR). The UE 115-a and base station 105-a may establish communications using a first beam pair, which may include a first downlink beam 210 and a first uplink beam 215, which may be referred to as a serving beam. The base station 105-a may periodically transmit reference signals (e.g., CSI-RS transmissions) using different beams 210, which may be measured by the UE 115-a, with associated channel metrics stored in a MDB at the UE 115-a. Measurements of the serving beam, as well as measurements of different beams, which may be referred to as candidate beams, may be stored in the MDB.

Figure 3:
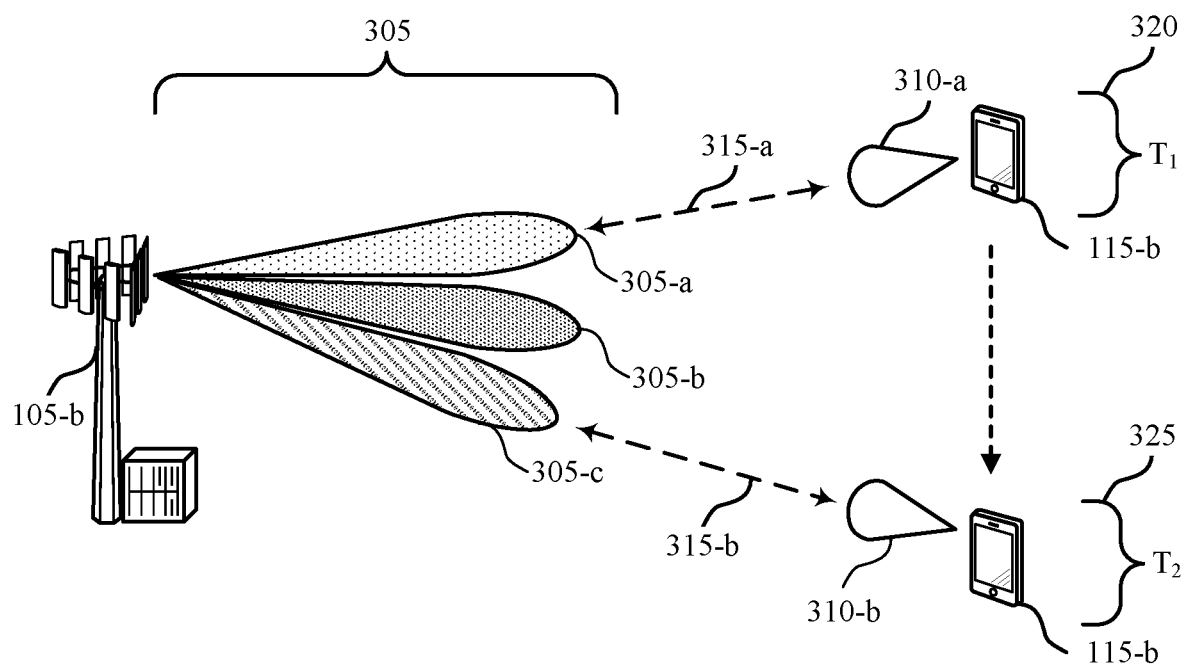
FIG. 3 illustrates an example of a wireless communications system that supports techniques for beam switching in wireless communications in accordance with aspects of the present disclosure.

Based on reference signals measurements of the serving beam and candidate beams, the UE 115-a may identify that a first candidate beam (or multiple candidate beams) may have a better channel metric than the serving beam. In some cases, upon identifying a candidate beam with a better channel metric, the UE 115-a may initiate a beam switch measurement counter, and perform one or more measurements of the candidate beam and the serving beam. The beam switch measurement counter may be, for example, a timer that corresponds to a certain number of periods of a beam measurement (e.g., based on a SSB periodicity of the base station 105-a), a number of beam measurements to be performed, and the like. When the beam switch measurement counter is enabled, the UE 115-a may measure the identified candidate beam and the current serving beam, and not perform measurements for beams other than the identified candidate beam(s) and serving beam. If the candidate beam has a better (e.g., higher) channel metric that the serving beam for each measurement instance of the beam switch measurement counter, the UE 115-a may switch to that candidate beam. The UE 115-a may perform the beam switch by transmitting a beam switch indication 225 and measurement report 220 (e.g., a CSI measurement report for one or more beams) to the base station 105-a. FIG. 3 illustrates one example of a determination to switch beams.

FIG. 3 illustrates an example of a wireless communications system 300 that supports techniques for beam switching in wireless communications in accordance with aspects of the present disclosure. In some examples, wireless communications system 300 may implement aspects of wireless communications system 100 or 200. For example, the wireless communications system 300 may include a UE 115-b and a base station 105-b, which may be examples of the corresponding devices described with reference to FIG. 1 or 2. In this example, the UE 115-b may move from a first location 320 at time $T_1$ to a second location 325 at time $T_2$. The base station 105-b may transmit using various downlink beams 305, and the UE 115-b may transmit using uplink beams 310, and beam reciprocity may be used to determine QCL parameters for the uplink beams 310 of the UE 115-b, although techniques as discussed herein may be applied in cases where decoupled beam pairs are used (e.g., where downlink beams and uplink beams of a serving beam pair link are not based on beam reciprocity).

In this example, the UE 115-b may, at time $T_1$, use a serving downlink beam 305-a, which corresponds to a beam pair link 315-a of the serving downlink beam 305-a and a first uplink beam 310-a. In this example, the UE 115-b may measure one or more channel metrics of one or more downlink beams 305 other than the serving downlink beam 305-a and store the associated channel metrics in a MDB. The UE 115-b may then move, at time $T_2$, to the second location 325, and the UE 115-b may measure a channel metric associated with the serving downlink beam 305-a that is degraded relative to prior measurements when the UE 115-b was at the first location 320. Further, the UE 115-b may have measurements associated with a second downlink beam 305-b and third downlink beam 305-c in its MDB, which may be candidate beams as discussed herein, that were obtained while the UE 115-b was at the first location 320.

In such a case, the UE 115-b, at time $T_2$, may identify candidate beams as the second downlink beam 305-b and a third downlink beam 305-c based on better channel metrics in the MDB than the most recent measurement of the serving downlink beam 305-a. However, in this example the measurements in the MDB may be stale, as being obtained when the UE 115-b was at the first location 320. Thus, if a beam switch were to be performed simply based on the MBD, the UE 115-b may simply select the second downlink beam 305-b based on the stale measurements. In accordance with techniques as discussed herein, the UE 115-b may initiate a beam switch measurement counter for both the second downlink beam 305-b and third downlink beam 305-c, and begin obtaining measurements for each identified candidate beam. In this example, the UE 115-b may identify the third downlink beam 305-c as having the best channel metric, and perform a beam switch procedure to switch communications to beam pair link 315-b of the third downlink beam 305-c and second uplink beam 310-b.

Figure 4:
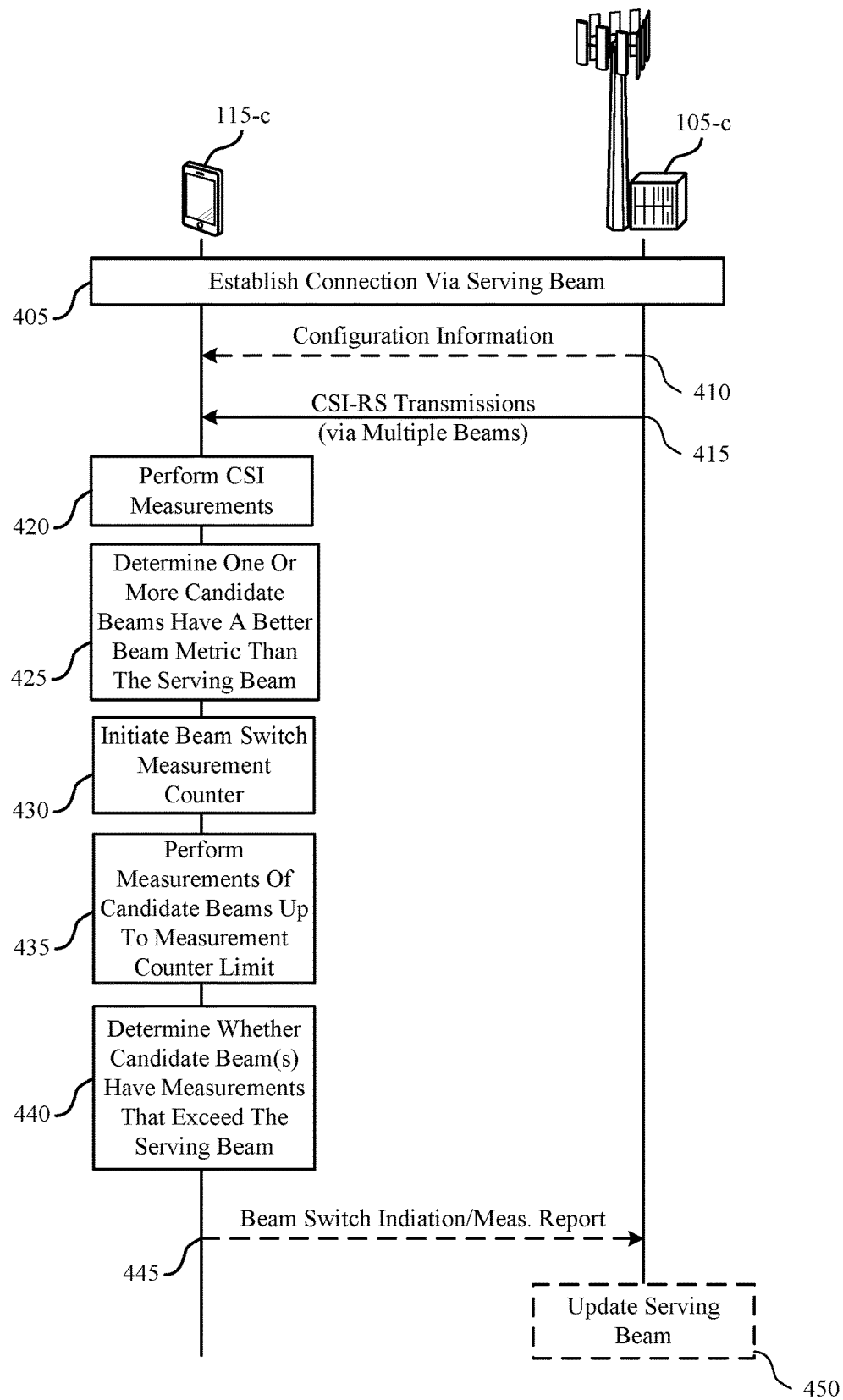
FIGS. 4 and 5 illustrate examples of process flows that support techniques for beam switching in wireless communications in accordance with aspects of the present disclosure.

FIG. 4 illustrates an example of a process flow 400 that supports techniques for beam switching in wireless communications in accordance with aspects of the present disclosure. In some examples, process flow 400 may implement aspects of wireless communications system 100, 200, or 300. Generally, the process flow 400 may illustrate the use of one or more beam switch measurement counters a UE 115-c for determining to perform a beam switch in communications with a base station 105-c. It is to be understood that the operations shown in the process flow 400 may be performed in a different order, operations performed at one device may be performed at another device, some operations may be removed, or additional operations may be performed.

At 405, the UE 115-c and base station 105-c may establish a connection via a serving beam. Such a connection may be established in accordance with connection establishment techniques in a NR system, for example. Optionally, at 410, the base station 105-c may transmit configuration information to the UE 115-c, which may include information related to CSI-RS periodicity for multiple beam transmissions of the base station 105-c (e.g., based on a SSB configuration), and the like. At 415, the base station 105-c may transmit CSI-RSs via multiple beams.

At 420, the UE 115-c may measure one or more of the CSI-RS transmissions of one or more beams. In some cases, the UE 115-c may measure channel metrics (e.g., RSRP, RSRQ, SNR, etc.) for the serving beam as well as one or more other beams, and store the channel metrics in a MDB.

At 425, the UE 115-c may determine that one or more candidate beams have a better beam metric than the serving beam. For example, the UE 115-c may measure a RSRP of the serving beam, and identify that a first candidate beam has a higher RSRP in the MDB.

At 430, the UE 115-c may initiate a beam switch measurement counter. In some cases, the beam switch measurement counter may be a timer that has a time duration that corresponds to a periodicity of CSI-RS transmissions of the base station 105-c times the number of measurements to be collected. In other cases, the beam switch measurement counter may be an absolute value of a count of a number of measurements that are to be taken prior to perform a beam switch at the UE 115-c.

At 435, the UE 115-c may perform measurements of the candidate beam(s) up to the measurement count limit. In some cases, each identified candidate beam may have its own associated beam switch measurement counter, and measurements of each candidate beam may be made up to the associated beam switch measurement counter limit, and thus if measurements of one candidate beam are discontinued (e.g., due to the measured channel metric not exceeding the serving beam channel metric), the UE 115-c may continue with measurements of other identified candidate beams.

At 440, the UE 115-c may determine, based on the performed measurements, whether the candidate beam(s) have measurements that exceed the associated measurements of the serving beam. For example, the UE 115-c may determine if a RSRP of a first candidate beam exceeds the RSRP of the serving beam. In some cases, multiple candidate beams may be identified, and such a determination may be made separately for each identified candidate beam. In the event that a candidate beam does have measurements that exceed the serving beam, the UE 115-c may, at 445, transmit a beam switch indication and measurement report to the base station 105-c. In cases where two or more candidate beams have measurements that exceed the serving beam measurements, the UE 115-c may select the candidate beam with a highest associated measurement, or with an otherwise acceptable associated metric. The base station 105-c may then update the serving beam based on the beam switch indication, as indicated at 450.

Figure 5:
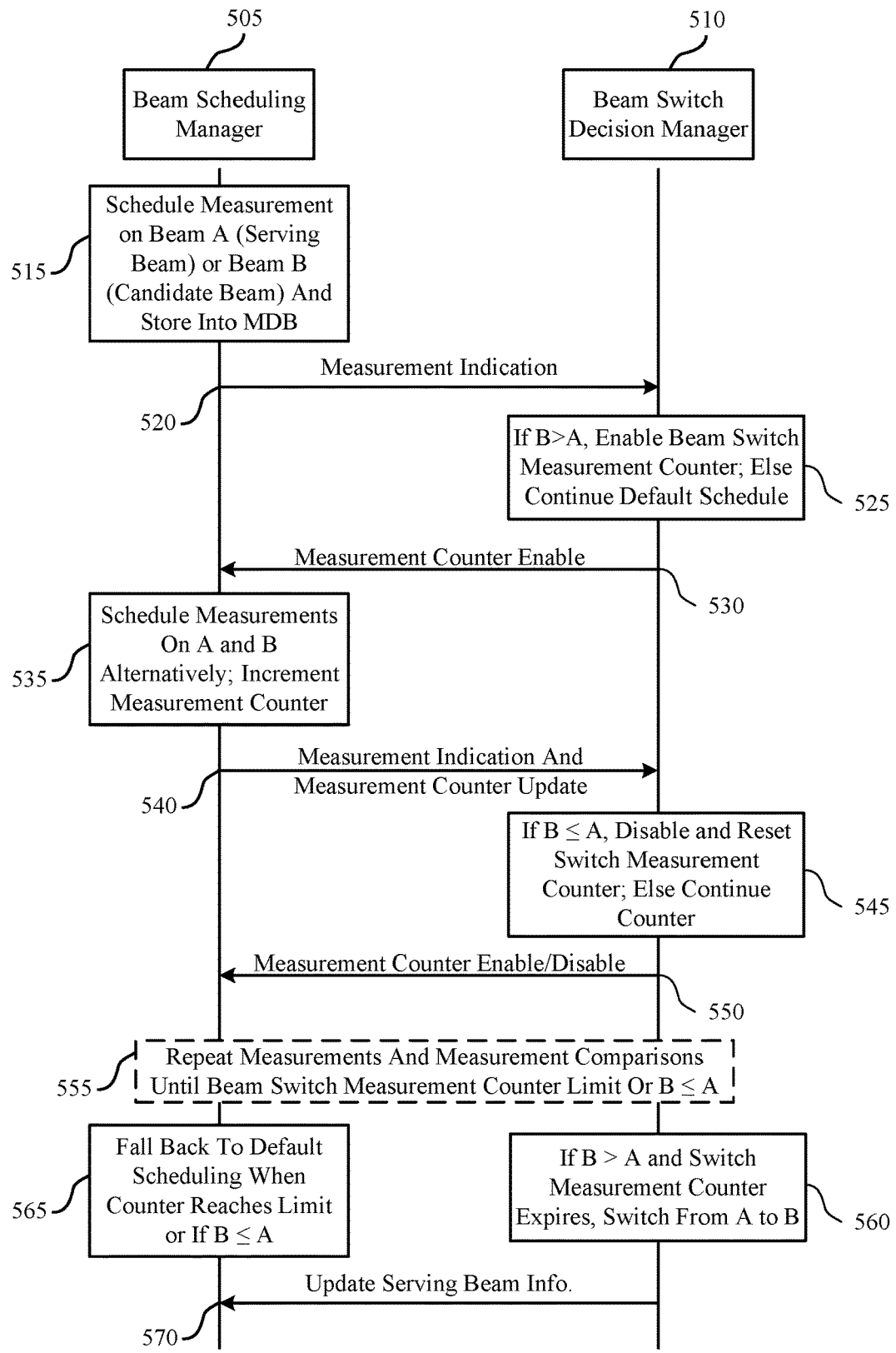

FIG. 5 illustrates an example of a process flow 500 that supports techniques for beam switching in wireless communications in accordance with aspects of the present disclosure. In some examples, process flow 500 may implement aspects of wireless communications system 100, 200, or 300. In this example, the process flow 500 may illustrate techniques at a UE (e.g., a UE 115 as discussed herein) for determining to perform a beam switch in communications with a base station. It is to be understood that the operations shown in the process flow 500 may be performed in a different order, operations performed at one device may be performed at another device, some operations may be removed, or additional operations may be performed. In this example, a beam scheduling manager 505 and a beam switch decision manager 510 at a UE may determine to perform a beam switch.

At 515, the beam scheduling manager 505 may schedule measurements on multiple beams, including beam A which may be a serving beam, and beam B which may be a candidate beam. The measurements made according to the schedule may be stored in a MDB at the UE. In some cases, the beam scheduling manager 505 may schedule measurements on multiple different beams based on a periodicity of reference signal transmissions on different beams from a base station. At 520, a measurement indication may be provided to the beam switch decision manager 510. In some cases, a beam measurement manager may perform the beam measurements in accordance with a schedule of the beam scheduling manager, and may provide the indication to the beam switch decision manager 510.

At 525, the beam switch decision manager 510 may evaluate the measurement associated with the measurement indication, and if the measured channel metric of beam B is greater than that of beam A (i.e., B>A) the beam switch decision manager 510 may enable a beam switch measurement counter associated with beam B. If the measured channel metric of beam B is not greater than that of beam A (i.e., B≤A) the beam switch decision manager 510 may continue with default measurement scheduling. At 530, based on determining to enable the beam switch measurement counter for beam B, the beam switch decision manager 510 may transmit a measurement counter enable indication to the beam scheduling manager 505. In some cases, the measurement counter enable indication may indicate the particular beam for which the measurement counter is enabled. In some cases, the measurement counter enable indication may be provided for two or more candidate beams that are identified as having better channel metrics than the serving beam.

At 535, the beam scheduling manager 505 may schedule measurements of beam A and beam B in an alternating manner, and may increment the beam switch measurement counter. In cases where two or more candidate beams are identified, the beam scheduling manager 505 may schedule measurements of the serving beam and each identified candidate beam in a round-robin manner. At 540, the beam scheduling manager 505 may provide a measurement indication and measurement counter update indication to the beam switch decision manager 510. In cases where multiple different candidate beams are identified, the beam scheduling manager 505 may provide separate measurement indications and measurement counter update indications to the beam switch decision manager 510.

At 545, the beam switch decision manager 510 may determine if the measured channel metric is better than the associated metric of the serving beam. In cases where beam B has a channel metric that is less than or equal to the corresponding channel metric of beam A (i.e., B≤A), the beam switch decision manager 510 may determine to disable and reset the beam switch measurement counter associated with beam B. In cases where multiple different candidate beams are identified and measured, the beam switch decision manager 510 may make such a determination separately for each identified candidate beam. In cases where beam B has a channel metric that exceeds the corresponding channel metric of beam A (i.e., B>A), the beam switch decision manager 510 may continue to enable the beam switch measurement counter for beam B (and for any other candidate beams with a better channel metric than the serving beam). At 550, the beam switch decision manager 510 may provide an indication to the beam scheduling manager 505 of whether the beam switch measurement counter is enabled or disabled.

Optionally, at 555, the beam scheduling manager 505 and the beam switch decision manager 510 may repeat the measurements and measurement comparisons until the beam switch measurement counter is incremented up to the measurement count threshold (e.g., one measurement, three measurements, etc.). In some cases, the measurement count threshold may be based on a type of mobility being experienced by the UE (e.g., based on a rate of change of UE movement where a higher rate of change may have a lower measurement count threshold, rotation of the UE where rotation-based mobility may have a lower measurement count threshold than non-rotation-based mobility, etc.), and the beam switch decision manager 510 may receive input from one or more different sensors of the UE (e.g., a gyroscopic sensor, a position determination sensor, accelerometer sensor, magnetometer sensor, etc.).

At 560, the beam switch decision manager 510 may determine to perform a beam switch based on the measured channel metric of beam B exceeding that of beam A for each measurement of the measurement count threshold.

At 565, the beam scheduling manager 505 may fall back to a default beam measurement scheduling when the beam measurement counter reaches the measurement count threshold or if the beam measurement counter is otherwise disabled. In some cases, as discussed herein, the beam measurement counter may be enabled separately for multiple candidate beams, and the beam scheduling manager 505 upon receiving an indication that one or more beam measurement counters are enabled, may disable measurements for any non-serving beams that do not have the beam measurement counter enabled. Thus, when the beam switch decision manager 510 disables the beam measurement counter for a beam, the beam scheduling manager 505 either falls back to the default scheduling for that particular beam if no other beams have an enabled beam measurement counter, or disables measurements for that particular beam if one or more other beams do have an enabled beam measurement counter. At 570, responsive to a beam switch, the beam switch decision manager may provide updated serving beam information to the beam scheduling manager 505.

Figure 6:
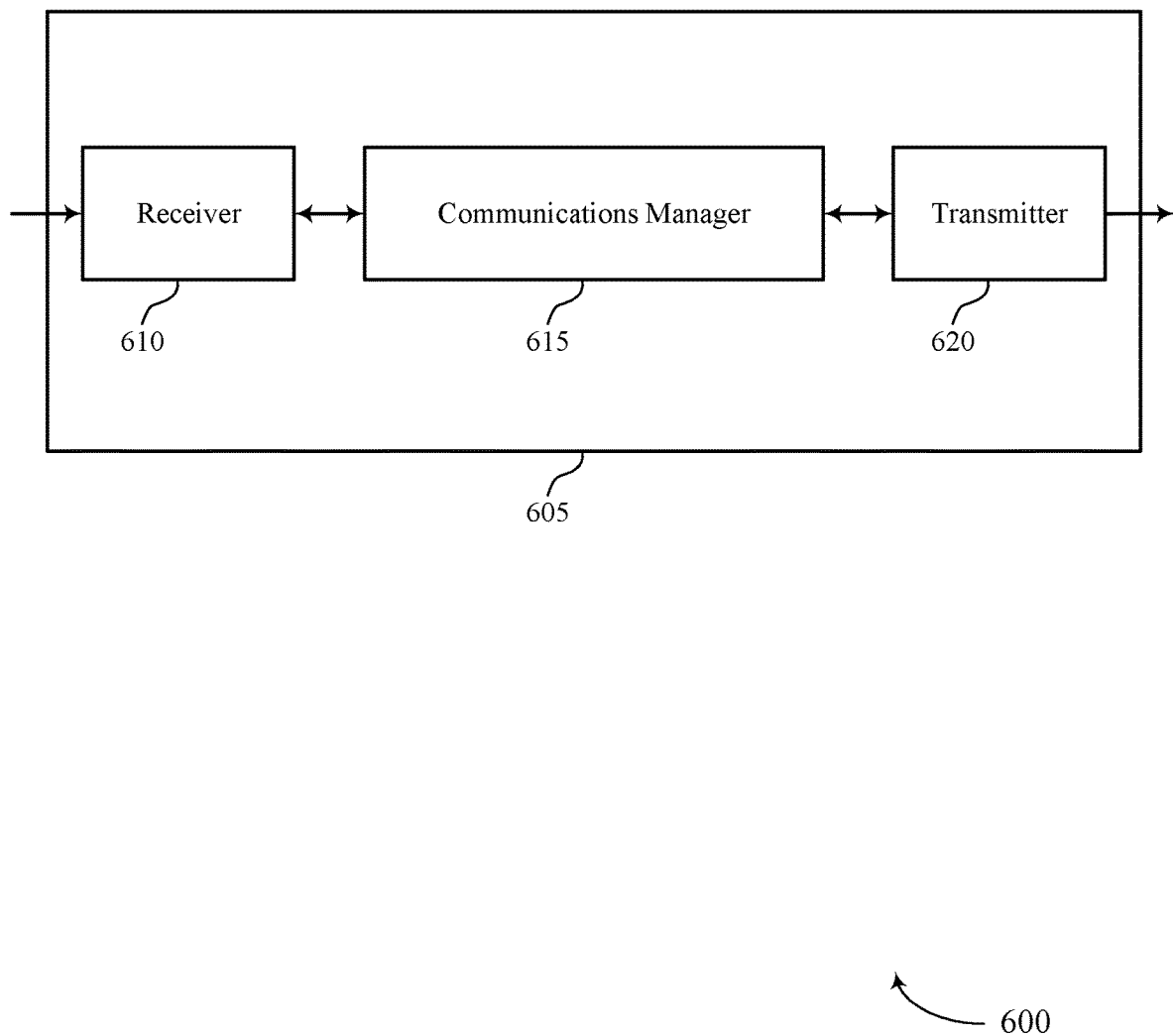
FIGS. 6 and 7 show block diagrams of devices that support techniques for beam switching in wireless communications in accordance with aspects of the present disclosure.

FIG. 6 shows a block diagram 600 of a device 605 that supports techniques for beam switching in wireless communications in accordance with aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to techniques for beam switching in wireless communications, etc.). Information may be passed on to other components of the device 605. The receiver 610 may be an example of aspects of the transceiver 920 described with reference to FIG. 9. The receiver 610 may utilize a single antenna or a set of antennas.

The communications manager 615 may identify a beam metric of a serving beam, measure one or more beam metrics, based on the measurement count threshold, for each of the one or more candidate beams, determine that one or more beam metrics of one or more candidate beams exceeds the beam metric of the serving beam at the UE, select the serving beam or a first candidate beam of the one or more candidate beams to use for communications based on the measuring, and initiate a beam switch measurement counter based on the determination, where the beam switch measurement counter is associated measurement count threshold. The communications manager 615 may be an example of aspects of the communications manager 910 described herein.

The actions performed by the communications manager 615 as described herein may be implemented to realize one or more potential advantages. For example, the communications manager 615 may implement beam switch procedures as discussed herein to confirm that a candidate beam has enhanced channel metrics relative to a serving beam prior to performing a beam switch to the candidate beam. Such operations may increase system performance, communication efficiency, and reliability.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

Figure 7:
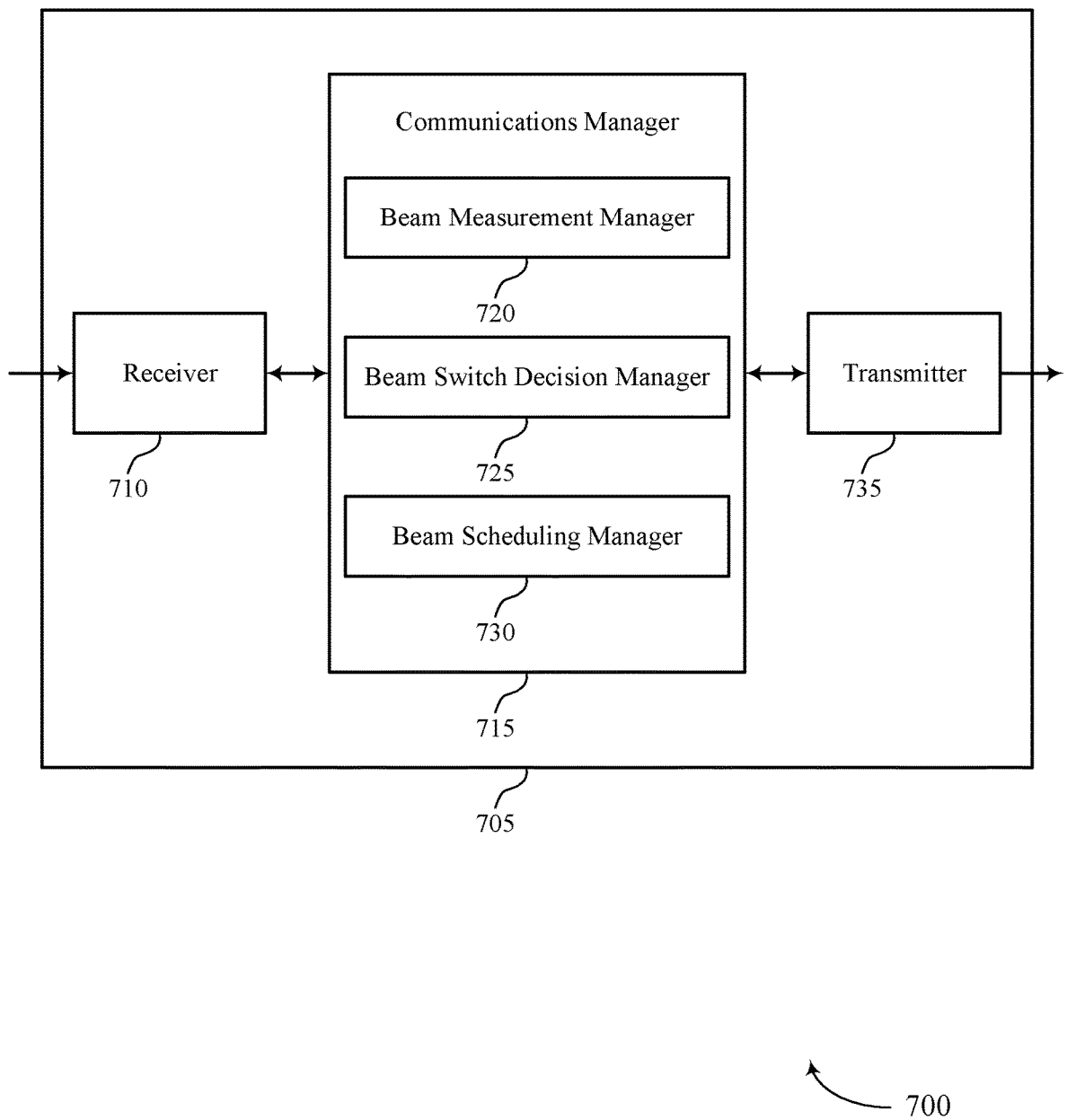

FIG. 7 shows a block diagram 700 of a device 705 that supports techniques for beam switching in wireless communications in accordance with aspects of the present disclosure. The device 705 may be an example of aspects of a device 605, or a UE 115 as described herein. The device 705 may include a receiver 710, a communications manager 715, and a transmitter 735. The device 705 may also include a processor. Each of these components may be in communication with one another (e.g., via one or more buses).

The receiver 710 may receive information such as packets, user data, or control information associated with various information channels (e.g., control channels, data channels, and information related to techniques for beam switching in wireless communications, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include a beam measurement manager 720, a beam switch decision manager 725, and a beam scheduling manager 730. The communications manager 715 may be an example of aspects of the communications manager 910 described herein.

The beam measurement manager 720 may identify a beam metric of a serving beam and measure one or more beam metrics, based on the measurement count threshold, for each of the one or more candidate beams.

The beam switch decision manager 725 may determine that one or more beam metrics of one or more candidate beams exceeds the beam metric of the serving beam at the UE and select the serving beam or a first candidate beam of the one or more candidate beams to use for communications based on the measuring.

The beam scheduling manager 730 may initiate a beam switch measurement counter based on the determination, where the beam switch measurement counter is associated measurement count threshold.

The transmitter 735 may transmit signals generated by other components of the device 705. In some examples, the transmitter 735 may be collocated with a receiver 710 in a transceiver module. For example, the transmitter 735 may be an example of aspects of the transceiver 920 described with reference to FIG. 9. The transmitter 735 may utilize a single antenna or a set of antennas.

Figure 8:
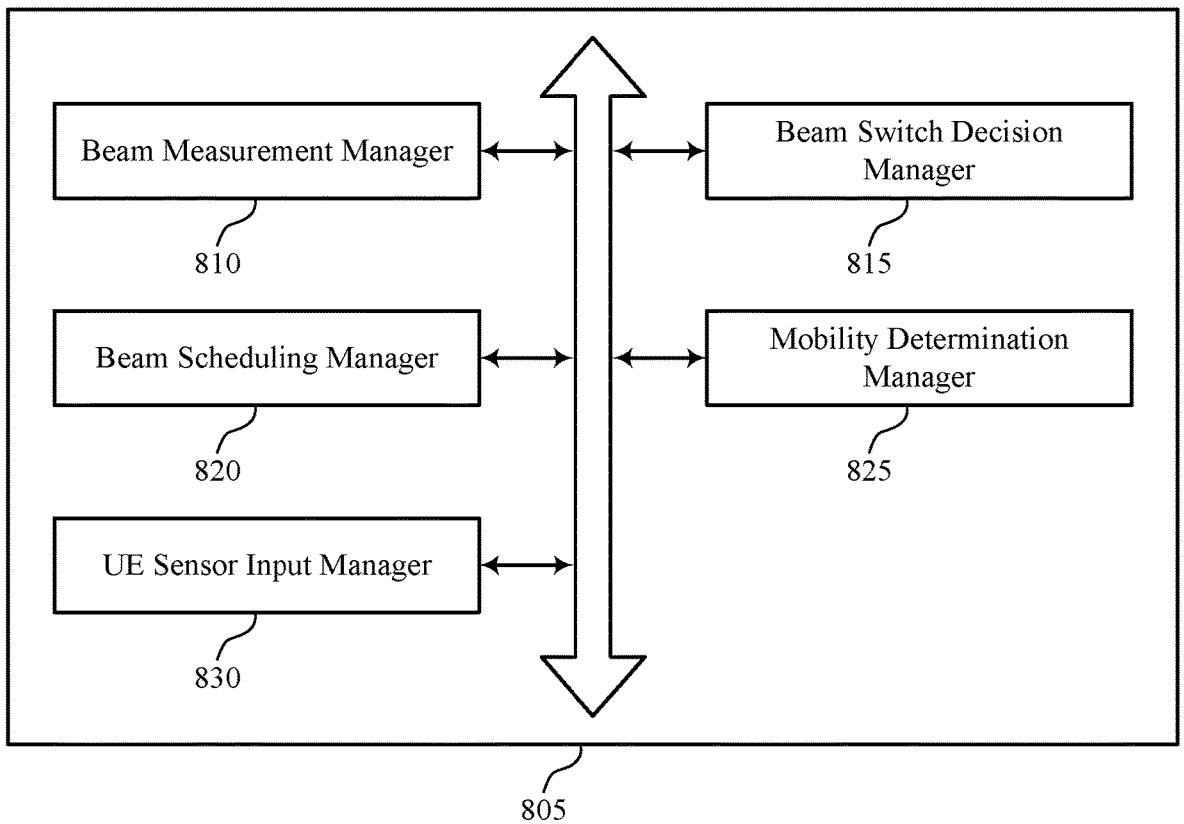
FIG. 8 shows a block diagram of a communications manager that supports techniques for beam switching in wireless communications in accordance with aspects of the present disclosure.

FIG. 8 shows a block diagram 800 of a communications manager 805 that supports techniques for beam switching in wireless communications in accordance with aspects of the present disclosure. The communications manager 805 may be an example of aspects of a communications manager 615, a communications manager 715, or a communications manager 910 described herein. The communications manager 805 may include a beam measurement manager 810, a beam switch decision manager 815, a beam scheduling manager 820, a mobility determination manager 825, and a UE sensor input manager 830. Each of these modules may communicate, directly or indirectly, with one another (e.g., via one or more buses).

The beam measurement manager 810 may identify a beam metric of a serving beam. In some examples, the beam measurement manager 810 may measure one or more beam metrics, based on a measurement count threshold, for each of the one or more candidate beams. In some cases, the one or more beam metrics include one or more of a RSRP, a RSRQ, a SNR, or any combinations thereof.

The beam switch decision manager 815 may determine that one or more beam metrics of one or more candidate beams exceeds the beam metric of the serving beam at the UE. In some examples, the beam switch decision manager 815 may select the serving beam or a first candidate beam of the one or more candidate beams to use for communications based on the measuring.

In some examples, the beam switch decision manager 815 may determine that the first candidate beam of the one or more candidate beams has a first candidate channel metric that exceeds the beam metric of the serving beam in each of one or more measurements of the first candidate beam. In some examples, the beam switch decision manager 815 may switch from the serving beam to the first candidate beam responsive to the determining. In some examples, the beam switch decision manager 815 may transmit a beam switch indication to a serving base station based on determining to use the first candidate beam for communications.

In some examples, the beam switch decision manager 815 may determine to maintain the serving beam based on the beam metric of the serving beam being equal to or better than at least one candidate channel metric from each of the one or more candidate beams. In some cases, the UE falls back to an original scheduling grant of the serving beam based on the determination to maintain the serving beam.

In some cases, the determining is performed by a beam switch decision manager of the UE. In some cases, the beam switch decision manager enables a separate beam switch measurement counter for each identified candidate beam. In some cases, the beam switch decision manager disables the beam switch measurement counter for an associated candidate beam based on the beam metric of the serving beam exceeding a candidate channel metric of the associated candidate beam.

The beam scheduling manager 820 may initiate a beam switch measurement counter based on the determination, where the beam switch measurement counter is associated measurement count threshold. In some cases, the one or more beam metrics from each of the one or more candidate beams are measured only for the one or more candidate beams for a duration of the measuring the one or more beam metrics. In some cases, the initiating the beam switch measurement counter is performed at the beam scheduling manager.

The mobility determination manager 825 may identify a type of mobility of the UE. In some examples, the mobility determination manager 825 may set the measurement count threshold based on the type of mobility.

The UE sensor input manager 830 may receive sensor inputs of one or more UE sensors. In some cases, the type of mobility is identified based on one or more of a motion sensor input, a positioning system input, a channel metric rate of change of one or more channel metric measurements, or any combinations thereof.

Figure 9:
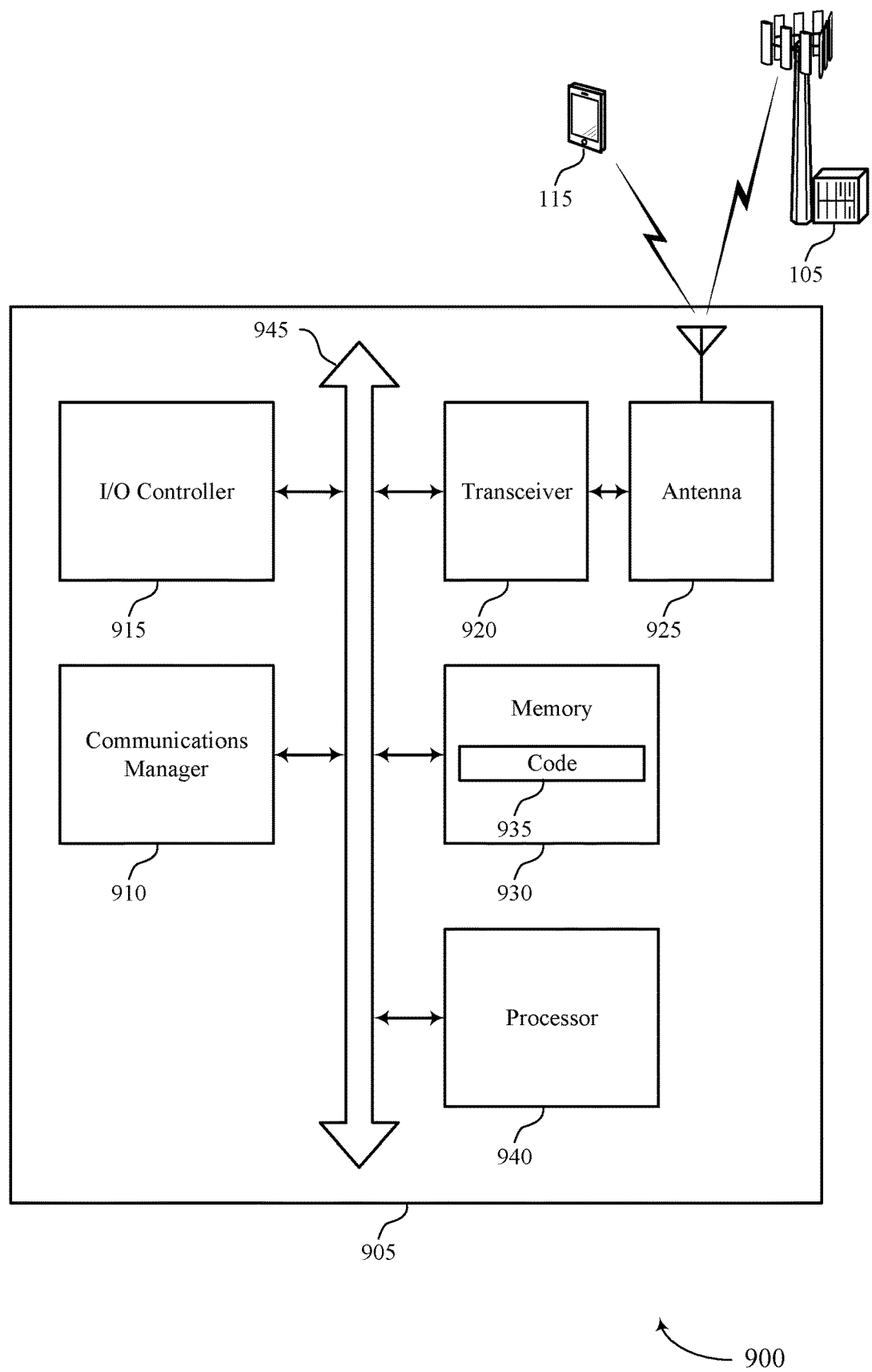
FIG. 9 shows a diagram of a system including a device that supports techniques for beam switching in wireless communications in accordance with aspects of the present disclosure.

FIG. 9 shows a diagram of a system 900 including a device 905 that supports techniques for beam switching in wireless communications in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may identify a beam metric of a serving beam, measure one or more beam metrics, based on the measurement count threshold, for each of the one or more candidate beams, determine that one or more beam metrics of one or more candidate beams exceeds the beam metric of the serving beam at the UE, select the serving beam or a first candidate beam of the one or more candidate beams to use for communications based on the measuring, and initiate a beam switch measurement counter based on the determination, where the beam switch measurement counter is associated measurement count threshold.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described herein. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include RAM and ROM. The memory 930 may store computer-readable, computer-executable code 935 including instructions that, when executed, cause the processor to perform various functions described herein. In some cases, the memory 930 may contain, among other things, a BIOS which may control basic hardware or software operation such as the interaction with peripheral components or devices.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting techniques for beam switching in wireless communications).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
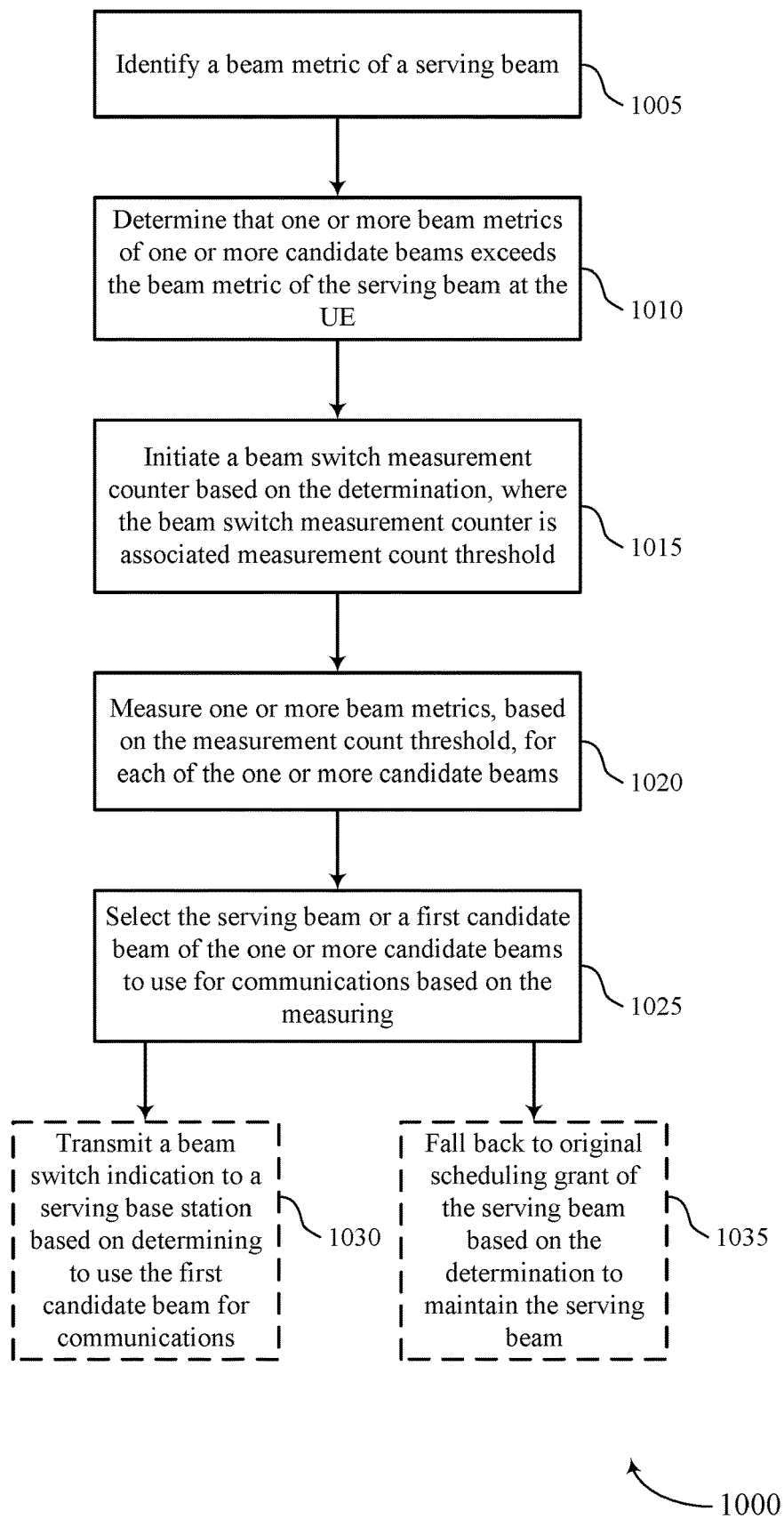
FIGS. 10 through 13 show flowcharts illustrating methods that support techniques for beam switching in wireless communications in accordance with aspects of the present disclosure.

FIG. 10 shows a flowchart illustrating a method 1000 that supports techniques for beam switching in wireless communications in accordance with aspects of the present disclosure. The operations of method 1000 may be implemented by a UE 115 or its components as described herein. For example, the operations of method 1000 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1005, the UE may identify a beam metric of a serving beam. The operations of 1005 may be performed according to the methods described herein. In some examples, aspects of the operations of 1005 may be performed by a beam measurement manager as described with reference to FIGS. 6 through 9.

At 1010, the UE may determine that one or more beam metrics of one or more candidate beams exceeds the beam metric of the serving beam at the UE. The operations of 1010 may be performed according to the methods described herein. In some examples, aspects of the operations of 1010 may be performed by a beam switch decision manager as described with reference to FIGS. 6 through 9.

At 1015, the UE may initiate a beam switch measurement counter based on the determination, where the beam switch measurement counter is associated measurement count threshold. The operations of 1015 may be performed according to the methods described herein. In some examples, aspects of the operations of 1015 may be performed by a beam scheduling manager as described with reference to FIGS. 6 through 9.

At 1020, the UE may measure one or more beam metrics, based on the measurement count threshold, for each of the one or more candidate beams. The operations of 1020 may be performed according to the methods described herein. In some examples, aspects of the operations of 1020 may be performed by a beam measurement manager as described with reference to FIGS. 6 through 9.

At 1025, the UE may select the serving beam or a first candidate beam of the one or more candidate beams to use for communications based on the measuring. The operations of 1025 may be performed according to the methods described herein. In some examples, aspects of the operations of 1025 may be performed by a beam switch decision manager as described with reference to FIGS. 6 through 9.

Optionally, at 1030, the UE may transmit a beam switch indication to a serving base station based on determining to use the first candidate beam for communications. The operations of 1030 may be performed according to the methods described herein. In some examples, aspects of the operations of 1030 may be performed by a beam switch decision manager as described with reference to FIGS. 6 through 9.

Alternatively, at 1035, the UE may fall back to an original scheduling grant of the serving beam based on the determination to maintain the serving beam. The operations of 1030 may be performed according to the methods described herein. In some examples, aspects of the operations of 1030 may be performed by a beam switch decision manager as described with reference to FIGS. 6 through 9.

Figure 11:
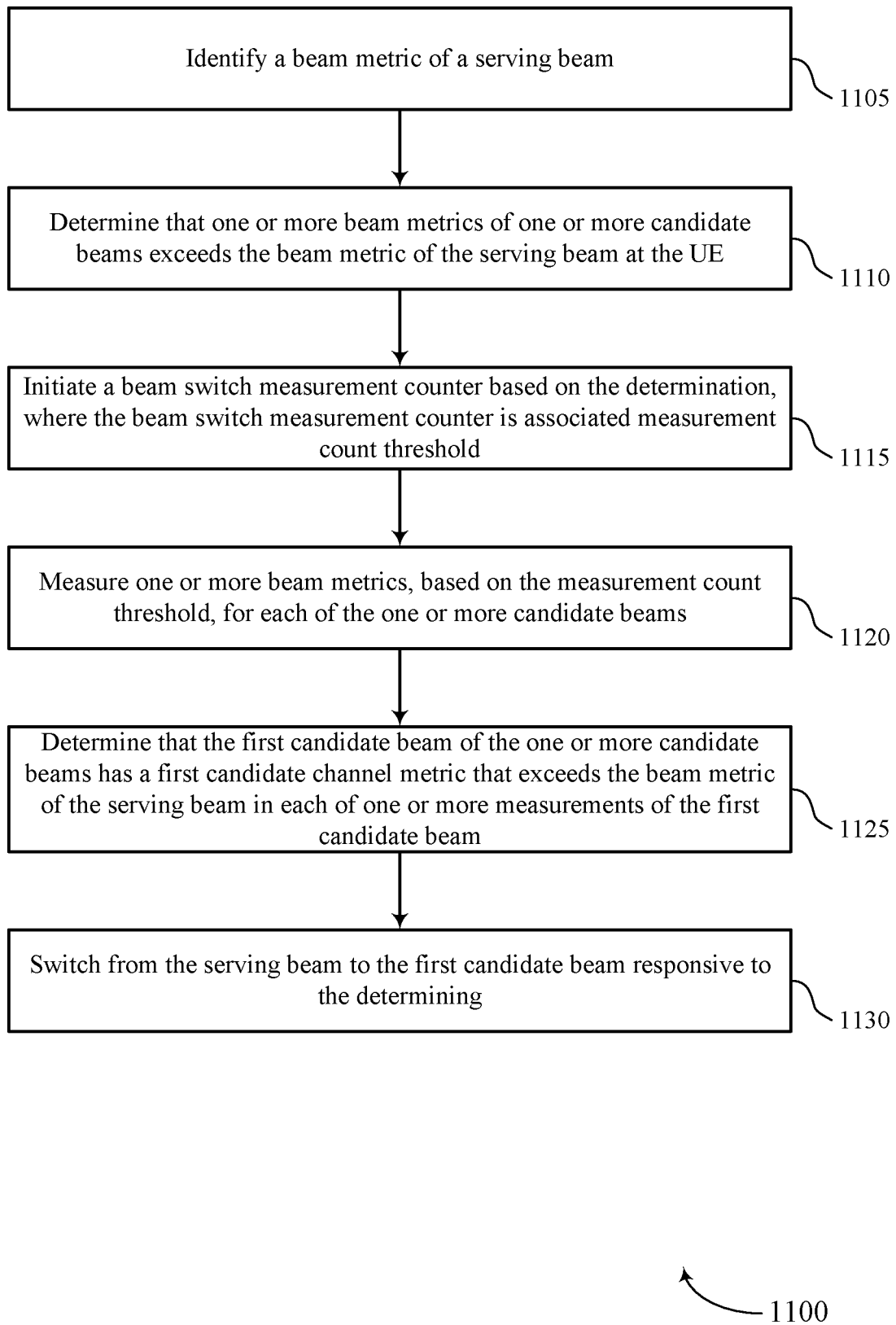

FIG. 11 shows a flowchart illustrating a method 1100 that supports techniques for beam switching in wireless communications in accordance with aspects of the present disclosure. The operations of method 1100 may be implemented by a UE 115 or its components as described herein. For example, the operations of method 1100 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1105, the UE may identify a beam metric of a serving beam. The operations of 1105 may be performed according to the methods described herein. In some examples, aspects of the operations of 1105 may be performed by a beam measurement manager as described with reference to FIGS. 6 through 9.

At 1110, the UE may determine that one or more beam metrics of one or more candidate beams exceeds the beam metric of the serving beam at the UE. The operations of 1110 may be performed according to the methods described herein. In some examples, aspects of the operations of 1110 may be performed by a beam switch decision manager as described with reference to FIGS. 6 through 9.

At 1115, the UE may initiate a beam switch measurement counter based on the determination, where the beam switch measurement counter is associated measurement count threshold. The operations of 1115 may be performed according to the methods described herein. In some examples, aspects of the operations of 1115 may be performed by a beam scheduling manager as described with reference to FIGS. 6 through 9.

At 1120, the UE may measure one or more beam metrics, based on the measurement count threshold, for each of the one or more candidate beams. The operations of 1120 may be performed according to the methods described herein. In some examples, aspects of the operations of 1120 may be performed by a beam measurement manager as described with reference to FIGS. 6 through 9.

At 1125, the UE may determine that the first candidate beam of the one or more candidate beams has a first candidate channel metric that exceeds the beam metric of the serving beam in each of one or more measurements of the first candidate beam. The operations of 1125 may be performed according to the methods described herein. In some examples, aspects of the operations of 1125 may be performed by a beam switch decision manager as described with reference to FIGS. 6 through 9.

At 1130, the UE may switch from the serving beam to the first candidate beam responsive to the determining. The operations of 1130 may be performed according to the methods described herein. In some examples, aspects of the operations of 1130 may be performed by a beam switch decision manager as described with reference to FIGS. 6 through 9.

Figure 12:
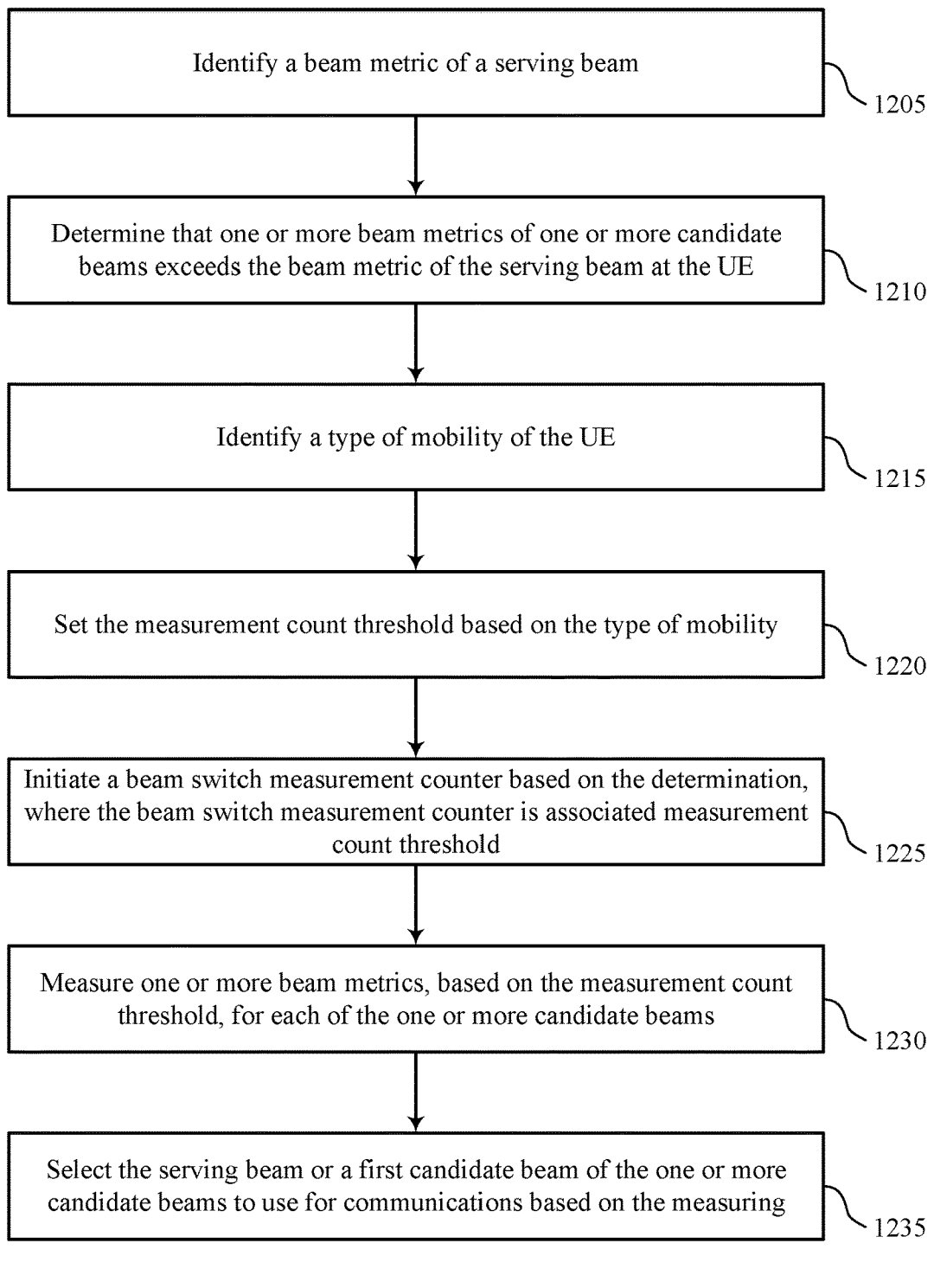

FIG. 12 shows a flowchart illustrating a method 1200 that supports techniques for beam switching in wireless communications in accordance with aspects of the present disclosure. The operations of method 1200 may be implemented by a UE 115 or its components as described herein. For example, the operations of method 1200 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1205, the UE may identify a beam metric of a serving beam. The operations of 1205 may be performed according to the methods described herein. In some examples, aspects of the operations of 1205 may be performed by a beam measurement manager as described with reference to FIGS. 6 through 9.

At 1210, the UE may determine that one or more beam metrics of one or more candidate beams exceeds the beam metric of the serving beam at the UE. The operations of 1210 may be performed according to the methods described herein. In some examples, aspects of the operations of 1210 may be performed by a beam switch decision manager as described with reference to FIGS. 6 through 9.

At 1215, the UE may identify a type of mobility of the UE. The operations of 1215 may be performed according to the methods described herein. In some examples, aspects of the operations of 1215 may be performed by a mobility determination manager as described with reference to FIGS. 6 through 9. In some cases, the type of mobility is identified based on one or more of a motion sensor input, a positioning system input, a channel metric rate of change of one or more channel metric measurements, or any combinations thereof.

At 1220, the UE may set the measurement count threshold based on the type of mobility. The operations of 1220 may be performed according to the methods described herein. In some examples, aspects of the operations of 1220 may be performed by a mobility determination manager as described with reference to FIGS. 6 through 9.

At 1225, the UE may initiate a beam switch measurement counter based on the determination, where the beam switch measurement counter is associated measurement count threshold. The operations of 1225 may be performed according to the methods described herein. In some examples, aspects of the operations of 1225 may be performed by a beam scheduling manager as described with reference to FIGS. 6 through 9.

At 1230, the UE may measure one or more beam metrics, based on the measurement count threshold, for each of the one or more candidate beams. The operations of 1230 may be performed according to the methods described herein. In some examples, aspects of the operations of 1230 may be performed by a beam measurement manager as described with reference to FIGS. 6 through 9.

At 1235, the UE may select the serving beam or a first candidate beam of the one or more candidate beams to use for communications based on the measuring. The operations of 1235 may be performed according to the methods described herein. In some examples, aspects of the operations of 1235 may be performed by a beam switch decision manager as described with reference to FIGS. 6 through 9.

Figure 13:
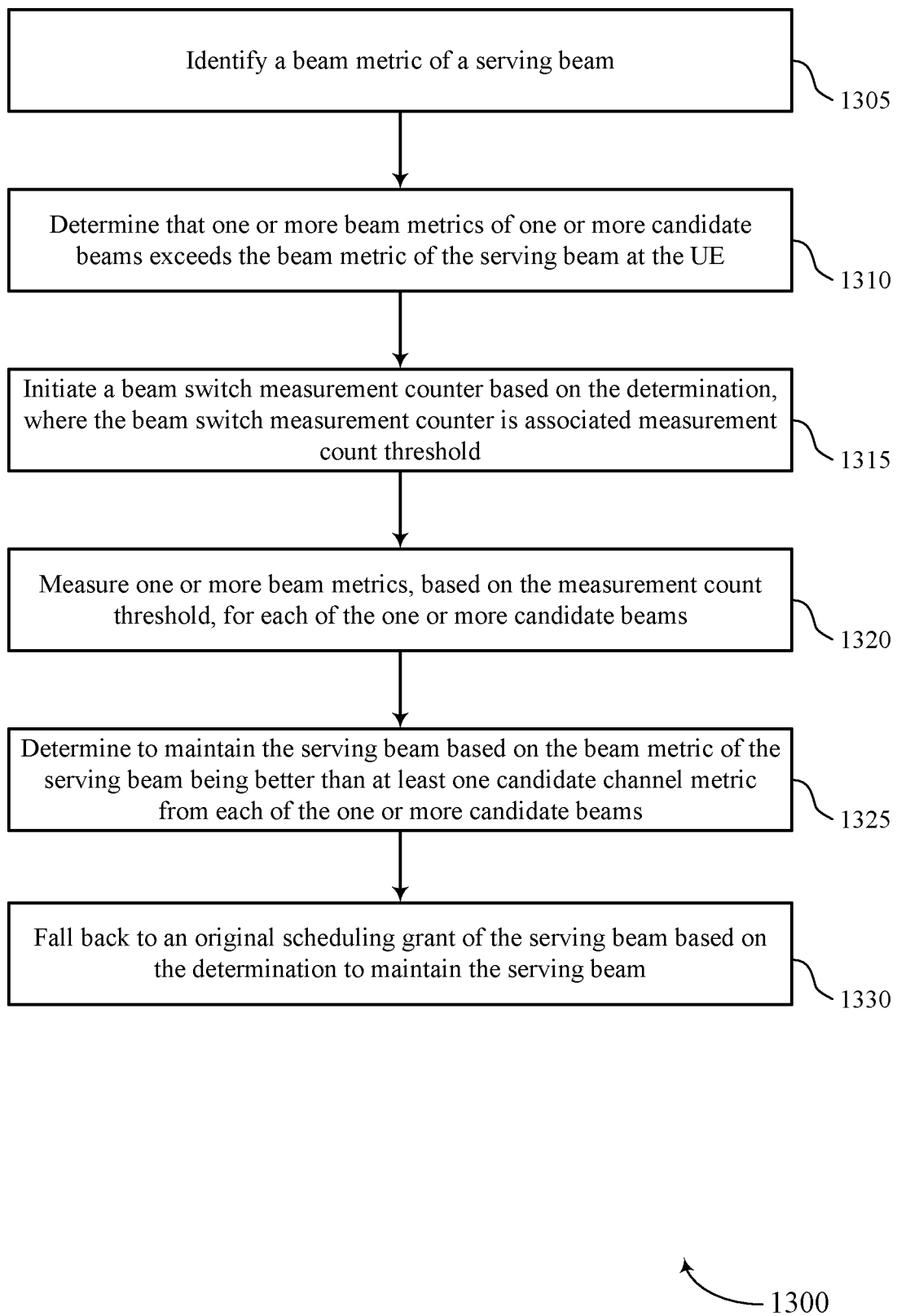

FIG. 13 shows a flowchart illustrating a method 1300 that supports techniques for beam switching in wireless communications in accordance with aspects of the present disclosure. The operations of method 1300 may be implemented by a UE 115 or its components as described herein. For example, the operations of method 1300 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1305, the UE may identify a beam metric of a serving beam. The operations of 1305 may be performed according to the methods described herein. In some examples, aspects of the operations of 1305 may be performed by a beam measurement manager as described with reference to FIGS. 6 through 9.

At 1310, the UE may determine that one or more beam metrics of one or more candidate beams exceeds the beam metric of the serving beam at the UE. The operations of 1310 may be performed according to the methods described herein. In some examples, aspects of the operations of 1310 may be performed by a beam switch decision manager as described with reference to FIGS. 6 through 9.

At 1315, the UE may initiate a beam switch measurement counter based on the determination, where the beam switch measurement counter is associated measurement count threshold. The operations of 1315 may be performed according to the methods described herein. In some examples, aspects of the operations of 1315 may be performed by a beam scheduling manager as described with reference to FIGS. 6 through 9.

At 1320, the UE may measure one or more beam metrics, based on the measurement count threshold, for each of the one or more candidate beams. The operations of 1320 may be performed according to the methods described herein. In some examples, aspects of the operations of 1320 may be performed by a beam measurement manager as described with reference to FIGS. 6 through 9.

At 1325, the UE may determine to maintain the serving beam based on the beam metric of the serving beam being better than at least one candidate channel metric from each of the one or more candidate beams. The operations of 1325 may be performed according to the methods described herein. In some examples, aspects of the operations of 1325 may be performed by a beam switch decision manager as described with reference to FIGS. 6 through 9.

At 1330, the UE may fall back to an original scheduling grant of the serving beam based on the determination to maintain the serving beam. The operations of 1330 may be performed according to the methods described herein. In some examples, aspects of the operations of 1330 may be performed by a beam switch decision manager as described with reference to FIGS. 6 through 9.

The following provides an overview of aspects of the present disclosure:

Aspect 1: A method for wireless communication at a UE, comprising: identifying a beam metric of a serving beam; determining that one or more beam metrics of one or more candidate beams exceeds the beam metric of the serving beam at the UE; initiating a beam switch measurement counter based at least in part on the determination, wherein the beam switch measurement counter is associated with a measurement count threshold; measuring one or more beam metrics, based at least in part on the measurement count threshold, for each of the one or more candidate beams; and selecting the serving beam or a first candidate beam of the one or more candidate beams to use for communications based at least in part on the measuring.

Aspect 2: The method of aspect 1, wherein the selecting comprises: determining that the first candidate beam of the one or more candidate beams has a first candidate channel metric that exceeds the beam metric of the serving beam in each of one or more measurements of the first candidate beam; and wherein the method further comprises switching from the serving beam to the first candidate beam responsive to the determining.

Aspect 3: The method of any of aspects 1 through 2, further comprising: identifying a type of mobility of the UE; and setting the measurement count threshold based at least in part on the type of mobility.

Aspect 4: The method of aspect 3, wherein the type of mobility is identified based at least in part on one or more of a motion sensor input, a positioning system input, a channel metric rate of change of one or more channel metric measurements, or any combinations thereof.

Aspect 5: The method of any of aspects 1 through 4, further comprising: transmitting a beam switch indication to a serving base station based at least in part on determining to use the first candidate beam for communications.

Aspect 6: The method of aspect 1, wherein the selecting comprises: determining to maintain the serving beam based at least in part on the beam metric of the serving beam being better than at least one candidate channel metric from each of the one or more candidate beams.

Aspect 7: The method of aspect 6, wherein the UE falls back to an original scheduling grant of the serving beam based on the determination to maintain the serving beam.

Aspect 8: The method of any of aspects 1 through 7, wherein the one or more beam metrics from each of the one or more candidate beams are measured only for the one or more candidate beams for a duration of the measuring the one or more beam metrics.

Aspect 9: The method of any of aspects 1 through 8, wherein the one or more beam metrics comprise one or more of a reference signal received power (RSRP), a reference signal received quality (RSRQ), a signal to noise ratio (SNR), or any combinations thereof.

Aspect 10: The method of any of aspects 1 through 9, wherein the initiating the beam switch measurement counter is performed at a beam scheduling manager of the UE.

Aspect 11: The method of aspect 10, wherein the determining is performed by a beam switch decision manager of the UE.

Aspect 12: The method of aspect 11, wherein the beam switch decision manager enables a separate beam switch measurement counter for each identified candidate beam.

Aspect 13: The method of aspect 12, wherein the beam switch decision manager disables the beam switch measurement counter for an associated candidate beam based at least in part on the beam metric of the serving beam exceeding a candidate channel metric of the associated candidate beam.

Aspect 14: An apparatus for wireless communication at a UE, comprising a processor; memory coupled with the processor; and instructions stored in the memory and executable by the processor to cause the apparatus to perform a method of any of aspects 1 through 13.

Aspect 15: An apparatus for wireless communication at a UE, comprising at least one means for performing a method of any of aspects 1 through 13.

Aspect 16: A non-transitory computer-readable medium storing code for wireless communication at a UE, the code comprising instructions executable by a processor to perform a method of any of aspects 1 through 13.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   identifying, at the UE, a beam metric of a serving beam;
   determining, at the UE, that one or more stored beam metrics of one or more candidate beams exceeds the beam metric of the serving beam at the UE, the one or more stored beam metrics stored before the identification of the beam metric of the serving beam;
   initiating, at the UE, a beam switch measurement counter based at least in part on the determination, wherein the beam switch measurement counter is associated with a measurement count threshold;
   measuring, responsive to the determination, one or more beam metrics at the UE, based at least in part on the measurement count threshold, for each of the one or more candidate beams; and
   selecting, at the UE, the serving beam or a first candidate beam of the one or more candidate beams to use for communications based at least in part on the measuring.

2. The method of claim 1, wherein the selecting comprises:
   determining that the first candidate beam of the one or more candidate beams has a first candidate channel metric that exceeds the beam metric of the serving beam in each of one or more measurements of the first candidate beam; and
   wherein the method further comprises switching from the serving beam to the first candidate beam responsive to the determining.

3. The method of claim 1, further comprising:
   identifying a type of mobility of the UE; and setting the measurement count threshold based at least in part on the type of mobility.

4. The method of claim 3, wherein the type of mobility is identified based at least in part on one or more of a motion sensor input, a positioning system input, a channel metric rate of change of one or more channel metric measurements, or any combinations thereof.

5. The method of claim 1, further comprising:
transmitting a beam switch indication to a serving network entity based at least in part on determining to use the first candidate beam for communications.

6. The method of claim 1, wherein the selecting comprises:
determining to maintain the serving beam based at least in part on the beam metric of the serving beam being better than at least one candidate channel metric from each of the one or more candidate beams.

7. The method of claim 6, wherein the UE falls back to an original scheduling grant of the serving beam based on the determination to maintain the serving beam.

8. The method of claim 1, wherein the one or more beam metrics from each of the one or more candidate beams are measured only for the one or more candidate beams for a duration of the measuring the one or more beam metrics.

9. The method of claim 1, wherein the one or more beam metrics comprise one or more of a reference signal received power (RSRP), a reference signal received quality (RSRQ), a signal to noise ratio (SNR), or any combinations thereof.

10. The method of claim 1, wherein the initiating the beam switch measurement counter is performed at a beam scheduling manager of the UE.

11. The method of claim 10, wherein the determining is performed by a beam switch decision manager of the UE.

12. The method of claim 11, wherein the beam switch decision manager enables a separate beam switch measurement counter for each identified candidate beam.

13. The method of claim 12, wherein the beam switch decision manager disables the beam switch measurement counter for an associated candidate beam based at least in part on the beam metric of the serving beam exceeding a candidate channel metric of the associated candidate beam.

14. An apparatus for wireless communication at a user equipment (UE), comprising:
a processor,
memory coupled with the processor; and
instructions stored in the memory and executable by the processor to cause the apparatus to:
identify, at the UE, a beam metric of a serving beam;
determine, at the UE, one or more stored beam metrics of one or more candidate beams exceeds the beam metric of the serving beam at the UE, the one or more stored beam metrics stored before the identification of the beam metric of the serving beam;
initiate, at the UE, a beam switch measurement counter based at least in part on the determination, wherein the beam switch measurement counter is associated with a measurement count threshold;
measure, responsive to the determination, one or more beam metrics at the UE, based at least in part on the measurement count threshold, for each of the one or more candidate beams; and
select, at the UE, the serving beam or a first candidate beam of the one or more candidate beams to use for communications based at least in part on the measuring.

15. The apparatus of claim 14, wherein the instructions are further executable by the processor to cause the apparatus to:
determine that the first candidate beam of the one or more candidate beams has a first candidate channel metric that exceeds the beam metric of the serving beam in each of one or more measurements of the first candidate beam; and
switch from the serving beam to the first candidate beam responsive to the determining.

16. The apparatus of claim 14, wherein the instructions are further executable by the processor to cause the apparatus to:
identify a type of mobility of the UE; and
set the measurement count threshold based at least in part on the type of mobility.

17. The apparatus of claim 16, wherein the type of mobility is identified based at least in part on one or more of a motion sensor input, a positioning system input, a channel metric rate of change of one or more channel metric measurements, or any combinations thereof.

18. The apparatus of claim 14, wherein the instructions are further executable by the processor to cause the apparatus to:
transmit a beam switch indication to a serving network entity based at least in part on determining to use the first candidate beam for communications.

19. The apparatus of claim 14, wherein the instructions are further executable by the processor to cause the apparatus to:
determine to maintain the serving beam based at least in part on the beam metric of the serving beam being better than at least one candidate channel metric from each of the one or more candidate beams.

20. The apparatus of claim 19, wherein the UE falls back to an original scheduling grant of the serving beam based on the determination to maintain the serving beam.

21. The apparatus of claim 14, wherein the one or more beam metrics from each of the one or more candidate beams are measured only for the one or more candidate beams for a duration of the measuring the one or more beam metrics.

22. An apparatus for wireless communication at a user equipment (UE), comprising:
means for identifying, at the UE, a beam metric of a serving beam;
means for determining, at the UE, that one or more stored beam metrics of one or more candidate beams exceeds the beam metric of the serving beam at the UE, the one or more stored beam metrics stored before the identification of the beam metric of the serving beam;
means for initiating, at the UE, a beam switch measurement counter based at least in part on the determination, wherein the beam switch measurement counter is associated with a measurement count threshold;
means for measuring, responsive to the determination, one or more beam metrics at the UE, based at least in part on the measurement count threshold, for each of the one or more candidate beams; and
means for selecting, at the UE, the serving beam or a first candidate beam of the one or more candidate beams to use for communications based at least in part on the measuring.

23. The apparatus of claim 22, further comprising:
means for determining that the first candidate beam of the one or more candidate beams has a first candidate channel metric that exceeds the beam metric of the serving beam in each of one or more measurements of the first candidate beam; and means for switching from the serving beam to the first candidate beam responsive to the determining.

24. The apparatus of claim 22, further comprising:
means for identifying a type of mobility of the UE; and
means for setting the measurement count threshold based at least in part on the type of mobility.

25. The apparatus of claim 22, further comprising:
means for transmitting a beam switch indication to a serving network entity based at least in part on determining to use the first candidate beam for communications.

26. The apparatus of claim 22, further comprising:
means for determining to maintain the serving beam based at least in part on the beam metric of the serving beam being better than at least one candidate channel metric from each of the one or more candidate beams.

27. The apparatus of claim 22, wherein the one or more beam metrics from each of the one or more candidate beams are measured only for the one or more candidate beams for a duration of the measuring the one or more beam metrics.

28. A non-transitory computer-readable medium storing code for wireless communication at a user equipment (UE), the code comprising instructions executable by a processor to:
identify, at the UE, a beam metric of a serving beam;
determine, at the UE, that one or more stored beam metrics of one or more candidate beams exceeds the beam metric of the serving beam at the UE, the one or more stored beam metrics stored before the identification of the beam metric of the serving beam;
initiate, at the UE, a beam switch measurement counter based at least in part on the determination, wherein the beam switch measurement counter is associated with a measurement count threshold;
measure, responsive to the determination, one or more beam metrics at the UE, based at least in part on the measurement count threshold, for each of the one or more candidate beams; and
select, at the UE, the serving beam or a first candidate beam of the one or more candidate beams to use for communications based at least in part on the measuring.

29. The non-transitory computer-readable medium of claim 28, wherein the instructions are further executable to:
determine that the first candidate beam of the one or more candidate beams has a first candidate channel metric that exceeds the beam metric of the serving beam in each of one or more measurements of the first candidate beam; and
switch from the serving beam to the first candidate beam responsive to the determining.

30. The non-transitory computer-readable medium of claim 28, wherein the instructions are further executable to:
identify a type of mobility of the UE; and
set the measurement count threshold based at least in part on the type of mobility.

* * * * *